United States Patent [19]

Weiland

[11] 4,163,630

[45] Aug. 7, 1979

[54] HELICOPTER ROTOR STRUCTURE

[75] Inventor: Emil Weiland, Hohenbrunn, Fed. Rep. of Germany

[73] Assignee: Messerschmitt-Bolkow-Blohm GmbH, Munich, Fed. Rep. of Germany

[21] Appl. No.: 824,241

[22] Filed: Aug. 12, 1977

[30] Foreign Application Priority Data

Aug. 25, 1976 [DE] Fed. Rep. of Germany ....... 2638148

[51] Int. Cl.² .............................................. B64C 27/38
[52] U.S. Cl. ................................ 416/134 A; 416/138; 416/141
[58] Field of Search .......... 416/132 R, 134 A, 140 A, 416/141, 138 A

[56] References Cited

U.S. PATENT DOCUMENTS

| | | | |
|---|---|---|---|
| 3,470,962 | 10/1969 | Cure | 416/135 X |
| 3,578,877 | 5/1971 | Mautz | 416/134 A |
| 3,879,153 | 4/1975 | Breuner | 416/138 A X |
| 3,880,551 | 4/1975 | Kisovec | 416/138 A X |

FOREIGN PATENT DOCUMENTS 1192427  5/1970  United Kingdom ................ 416/134 A

*Primary Examiner*—Everette A. Powell, Jr.
*Attorney, Agent, or Firm*—W. G. Fasse; D. F. Gould

[57] ABSTRACT

The rotor blades or wings of the present helicopter rotor structure are interconnected by tension or carrier bars so that diametrically opposite rotor blades or wings form a pair. The tension bars are substantially stiff against bending, but permit some bending. The blade angle bearings are movable in the blade flapping direction, as well as in the blade lead-lag direction. At least one blade angle bearing of a pair of such bearings permits an axial movement of the respective tension or carrier bar, whereby the latter is able to take up bending loads.

11 Claims, 4 Drawing Figures

HELICOPTER ROTOR STRUCTURE

BACKGROUND OF THE INVENTION

The present invention relates to a helicopter or rotary wing aircraft rotor structure, wherein the wings or blades are arranged in pairs and the members of a pair are located diametrically opposite each other. The wings or blades are secured to the rotor head without flapping hinges and without drag or lagging hinges, however, not in a rigid manner. There are provided blade angle bearings which secure the blades or wings to the rotor head radially outwards thereon. The blade angle bearings permit the movement of the blades through an pitch angle range and support the blades in a rotatable manner. Two blades forming a pair are interconnected respectively at the blade or wing roots by means of a tension bar element which is elastic against torsion loads between its ends.

German Pat. No. 1,531,355 discloses a rotor of this type including a rigidly constructed rotor head. The rotor blades or wings are rotatably secured to the rotor head. One end of each rotor blade is rigidly supported and two rotor blades are interconnected as a pair by means of laminated bars rigid against tension but elastic relative to torsion and bending loads. In such a structure the bending moments effective at the blade or wing roots must be taken up by the blade angle bearings and by the rotor head, whereby these stuctural elements are subject to substantial loads requiring a respectively strong dimensioning which in turn results in a correspondingly high structural weight. Further rotor systems are well known in the art in which the rotor head itself is constructed to be flexible, thereby taking up the major proportion of the deformations occurring when the blades or wings perform a flapping motion. This type of structure, however, results in a disadvantageous position of the fictitious or assumed flapping hinges radially inside the blade angle bearings, whereby the control characteristics of the rotor are influenced in a disadvantageous manner. Besides, this type of structure results in substantial bending moment loads to which the rotor head is subjected, whereby the moment curve or characteristic rises steeply toward the rotor axis. Further, large shearing loads or stresses occur in the area where the largest deformations take place so that the rotor head must be constructed on the one hand to easily yield against bending in the flapping direction and on the other hand, it must be capable of withstanding high dynamic loads. These two requirements are incompatible with each other and hence it is difficult to realize such a structure in practice unless a high expense and a heavy structural weight are not avoided in order to assure a safe function or operation.

German Patent Publication (DOS) No. 2,452,535 discloses an arrangement in which the rotor blades are interconnected in pairs by means of a carrier spar or beam which is yielding against bending and elastic against torsional loads. The carrier beam is secured to a rigidly constructed rotor head adjacent to the rotational axis of the rotor by means of closely spaced, angularly movable and axially displaceable bearing points which secure the carrier beam in a manner rigid against rotation. Such a structure, however, also has large peaks in the bending moment curve, especially adjacent to the rotational axis of the rotor. In addition, the structure is generally subject to rather undesirable flapping motions of the rotor blades or wings.

OBJECTS OF THE INVENTION

In view of the foregoing, it is the aim of the invention to achieve the following objects, singly or in combination;

to construct a rotor for a rotary wing aircraft in which the loads effective on the rotor head are reduced and wherein the structure is simple as well as light in weight;

to provide a rotor structure for a helicopter which has good steering characteristics, especially an advantageous position of the fictitious flapping hinges;

to construct the blade angle bearings in such a manner that no bending moments are transmitted from the blade roots to the rotor head, whereby the latter is substantially relieved of bending loads without influencing the aerodynamic characteristics of the rotors;

to substantially improve the load and force distribution in the rotor structure of a helicopter;

to connect the rotor blades with the carrier beam or tension bars in a manner rigid against rotation of the blades about their longitudinal axes, however to make the tension bars elastic to torsional loads;

to construct the tension bars or carrier beams in such a manner that the characteristics of fiber composite materials are taken into account as well as the loads to which the structure is subjected in use;

to construct the tension bars in such a manner that they are rigid against torsion radially outwardly of the points where control forces are introduced and that they are elastic relative to torsion loads intermediate such force introducing points;

to arrange the steering elements in such a manner that a blade angle reduction is accomplished in response to an excursion of the rotor blades and in response to a bending of the tension bars in the flapping direction.

SUMMARY OF THE INVENTION

According to the invention there is provided a helicopter rotor structure wherein the rotor blades are inconnected in pairs at their roots by means of tension bars or elements which are resistant against bending and wherein the blade angle bearings are angularly movable in the wing flap direction as well as in the wing lead-lag direction while at least one of two blade angle bearings interconnecting two blades of a pair is constructed to permit an axial movement of the respective tension bar means in the direction of the longitudinal axis of the tension bar means.

In the rotor structure according to the invention, bending moments are not transmitted from the blade roots to the rotor head due to the particular type of blade angle bearings and due to the construction of the tension bars to act as carrier beams which are resistant against bending in the flapping direction as well as in the blade lead-lag direction. Rather, such bending moments are compensated between two oppositely arranged rotor blades of a pair by means of the respective carrier beam which bends, however slightly, under a bending load. This type of arrangement substantially reduces the bending loads on the rotor head without adversely affecting the aerodynamic characteristics of the rotor. Simultaneously, and surprisingly, the transverse forces and hence, also the shearing stress component between the blade angle bearings do not increase toward the rotational axis of the rotor. Rather, these transverse forces and shearing stress components may vary between zero and a low substantially constant value depending on the flapping shape or tilting shape of the rotor blades. Another advantage of the invention is seen in that the present rotor structure may be built of a few structural components having a low weight and which are relatively inexpensive. This is possible due to the substantially improved stress and force distribution. For the same reasons, the present rotor structure has a good steering characteristic as well as a high operational reliability.

According to a preferred embodiment of the invention, the rotor blades are secured to the support beams or tension bars in a manner rigid against rotation while the tension bars themselves are elastic relative to torsion loads. The tension bars or carrier beams are secured intermediate their ends to the rotor head to be freely rotatable relative to the rotor head. As a result, the carrier beams are tilted by the same amount as the respective blades during the cyclical adjustment or control of the pitch angle. During such control two opposite blades forming a pair are tilted simultaneously in the same direction and by the same amount relative to the longitudinal axis of the blades. As a result, the carrier beams or tension bars are subject to torsion loads only intermediate their ends during the collective blade angle adjustment. Accordingly, a relatively small torsion elasticity of the carrier beams or tension bars is sufficient for the control of the pitch angle of the blades and hence it is possible to construct these bars in a simple manner and simultaneously rigid against bending moments.

In order to achieve a simple manner of manufacture as well as a low structural weight and a high strength, the tension bars according to the invention, are suitably made of a composite fiber material.

An especially advantageous construction of the carrier beams or tension bars is accomplished by forming these bars in the manner of girders or bending stress beams including reinforced boom sections which are spaced from each other at least at certain points by means of web sections, whereby these tension bars are torsion elastic within certain limits while simultaneously being substantially rigid against bending in the flapping direction as well as in the lead-lag direction and also substantially rigid against tension stress. In this particular embodiment the tension bars comprise fibers which extend in the longitudinal direction along the boom sections whereas in the area of the webs the fibers cross each other at angles of about ±45° relative to the longitudinal direction of the boom. The use of composite fiber materials has been found to be especially advantageous with regard to the best use of the material qualities while simultaneously achieving a structure of the tension bars which takes the loads fully into account.

In order to improve in such a composite fiber material structure, the torsion elasticity of the tension bars for carrier beams while simultaneously maintaining a high bending and tensile strength it is advantageous to construct the boom sections of the tension bar means of a plurality of composite fiber material belts extending in the longitudinal direction of the boom sections. Intermediate layers of elastomeric material are interposed between the belts of composite fiber material. Preferably, the intermediate layers of elastomeric materials are provided with recesses adjacent to the ends of the tension bars. Intermediate plies of fiber composite material are bonded into said recesses. As a result, the tension bars are made rigid against torsion loads in areas radially outwardly of the force introduction point of the control forces. Merely the sections intermediate the force introduction points are elastic relative to torsion loads so that uncontrolled pitch angle motions of the blades or wings are prevented.

It has been found that an especially suitable structure may be obtained by locating the blade angle bearings in the open cross-section of the tension or carrier bars. For safety purposes, it is preferrable that each blade angle bearing is provided with means constituting an emergency support bearing.

Where two control members are connected to each tension bar it is especially preferred that the opposite end of each steering or control member, namely the end connected to a control rod or steering rod is laterally displaced in the longitudinal direction of the tension bar and/or laterally relative to the point at which the control member is secured to the tension bar. Said displacement is provided in such a manner that a blade angle reduction is accomplished in response to an excursion of the rotor blades and in response to any bending of the tension bars in the flapping direction. In this manner the invention utilizes quite simply the bending of the tension bar for improving the control or steering characteristic of the rotor, whereby this type of feedback control may be varied in accordance with the selected position of the connecting points between control members and the tension bar and inaccordance with the longitudinal spacing of the control member ends opposite said connecting points.

In order to further reduce the structural weight of the rotor, it is preferrable that the rotor head forms the bearing ring of the rotor bearing so that a direct force transmission takes place over the shortest possible distance between the blade angle bearings and the aircraft or helicopter frame. Another advantage of this feature is seen in that the outer diameter of the rotor head and the mutual radial spacing of the blade angle bearings may be selected to be large, whereby simultaneously the effective loads are reduced.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
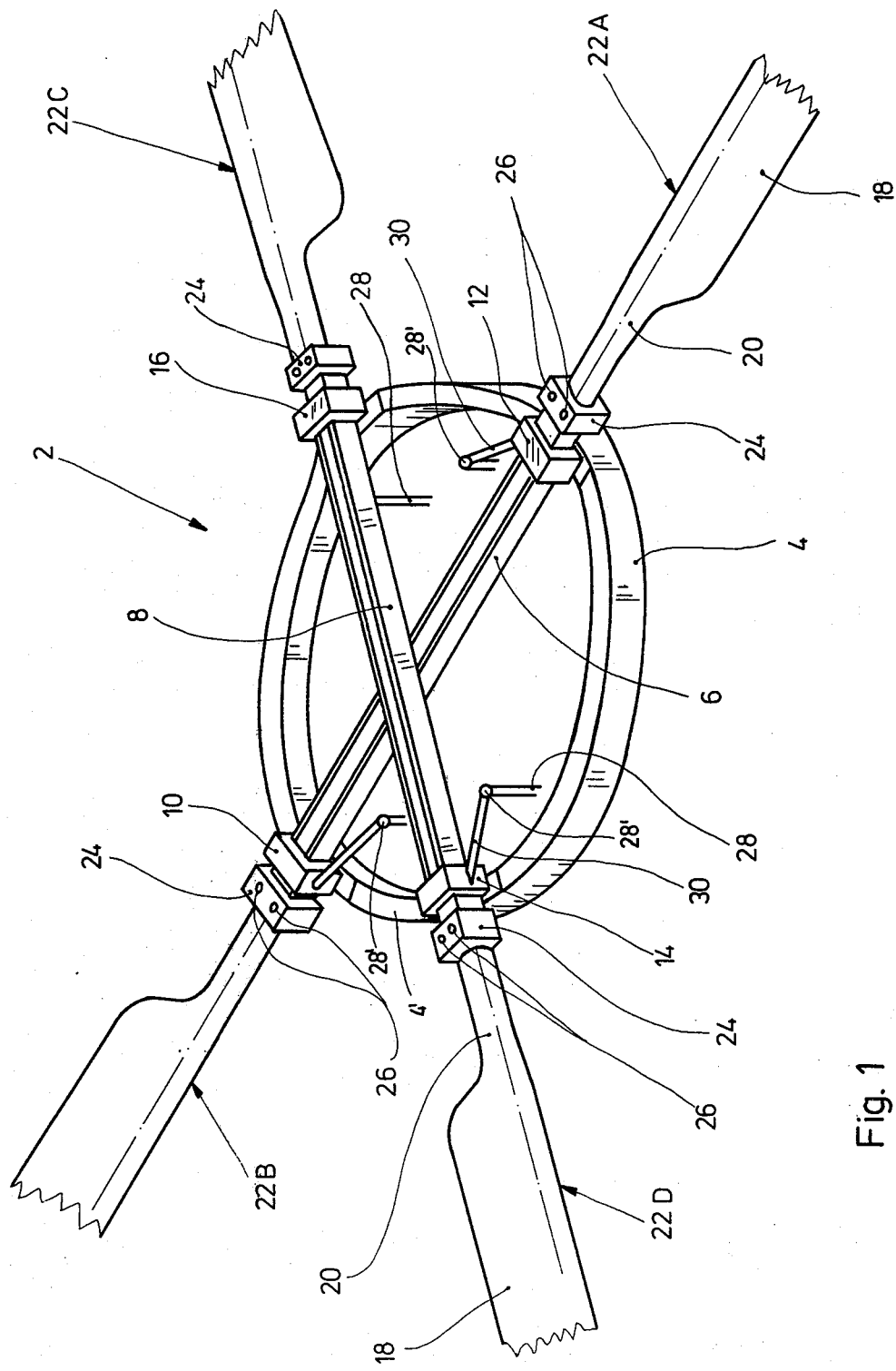
FIG. 1 is a schematic perspective illustration of a helicopter main rotor, according to the invention.

According to FIG. 1, the rotor 2 comprises a rigidly constructed rotor head including a ring 4 which is directly secured to the aircraft frame structure by means of a rotor bearing, not shown, for rotation by conventional power and gear means. Two carrier beams or tension bars 6 and 8 are rotatably supported on the rotor head ring 4 by means of blade angle bearings 10 and 12, as well as 14 and 16 arranged at the ends of the respective bars 6 and 8. The bars 6 and 8 cross each other substantially at right angles and are constructed to be substantially rigid against tension and bending loads. Incidentally, the term "rigid against bending loads" as used in this context refers to the strength of the bars 6 and 8 against bending stress. The term is intended to mean that the bars 6 and 8 have a sufficient bending strength and it does not mean that these bars cannot be bent. The bars 6 and 8 are supported in such a manner that a certain spacing between them is maintained in the direction of the rotational axis of the rotor structure and so that they may bend independently of each other in the blade lead-lag direction as well as in the blade flapping direction. The blade lead-lag direction extends substantially in the plane of rotation of the rotor and the blades whereas the blade flapping direction extends substantially vertically and perpendicularly to a plane perpendicular to the rotational axis of the rotor structure. Each rotor blade end section 18 is connected through a blade neck 20 to the end of its respective bar 6 or 8 in the area of the corresponding blade angle bearings 10, 12, 14 and 16. The blade neck 20 is constructed so as to substantially yield against bending loads in the flapping direction as well as in the blade lead-lag direction while simultaneously being rigid or substantially rigid against torsion loads exerted by torsion moments around the longitudinal blade axis. The connection of each rotor blade to its bar 6, 8 is accomplished by means of a fitting 24 surrounding the so-called blade root and secured by means of two connecting bolts 26. The connection between the fitting 24 and the end of the respective bar 6, 8 is completely rigid so that it does not permit any flapping nor any drag or lagging movements.

The blade angle motion is controlled by means of control or steering rods 28 pivoted at 28' to an outer end of a respective steering member 30 also referred to as a so-called steering horn 30. The inner end of each steering member or horn 30 is secured to the respective bar 6 or 8 as a unit. During the cyclical movement of the blade which determines the instantaneous pitch angle, each of the bars 6 or 8 is pivoted about the longitudinal blade axis and in unison with its respective pair of blades 22A, 22B or 22C, 22D. Thus, the bars 6, 8 are twisted only between the securing points of the steering members 30 to the respective bar 6, 8 during the collective blade angle adjustment. To this end the bars 6 and 8 are constructed so as to be elastic within predetermined limits relative to such torsional loads as they result from the blade angle adjustment.

Figure 2:
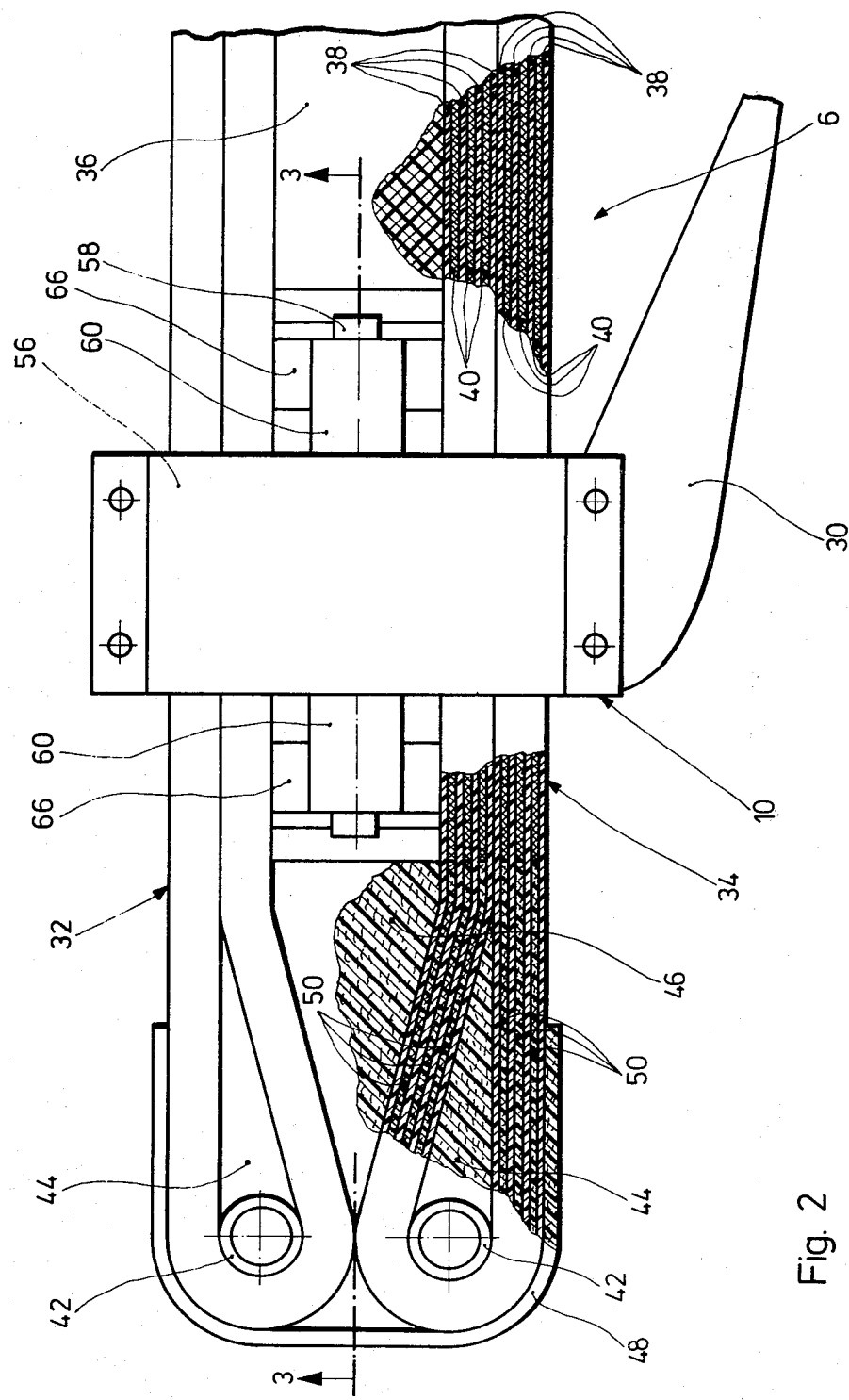
FIG. 2 illustrates, partially in a broken-away plan view, a carrier beam or tension bar including a blade angle bearing.
Figure 3:
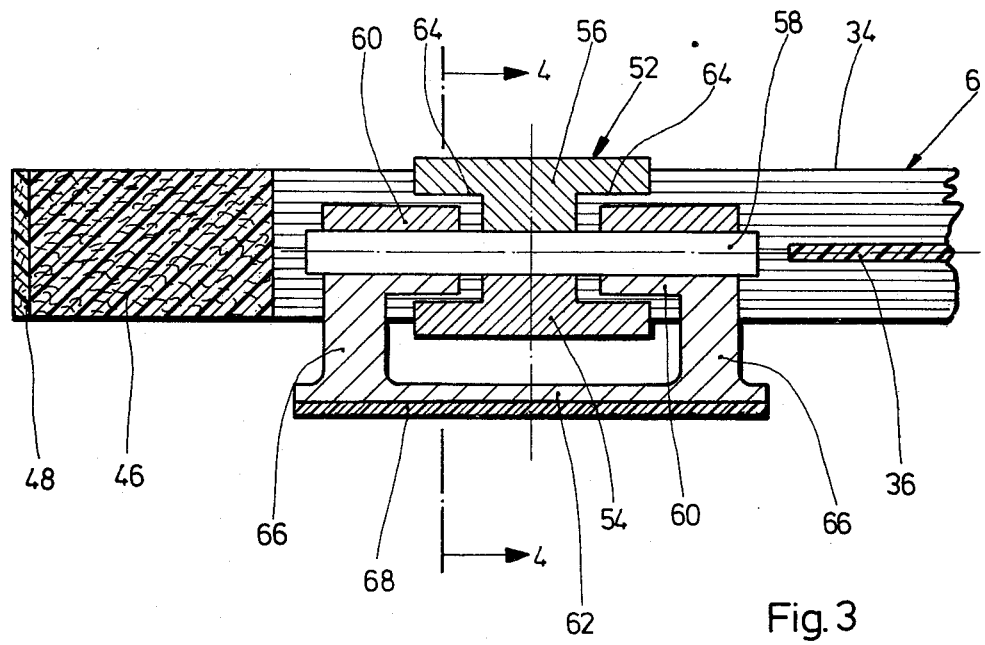
FIG. 3 is a sectional view along the section line III—III of FIG. 2.
Figure 4:
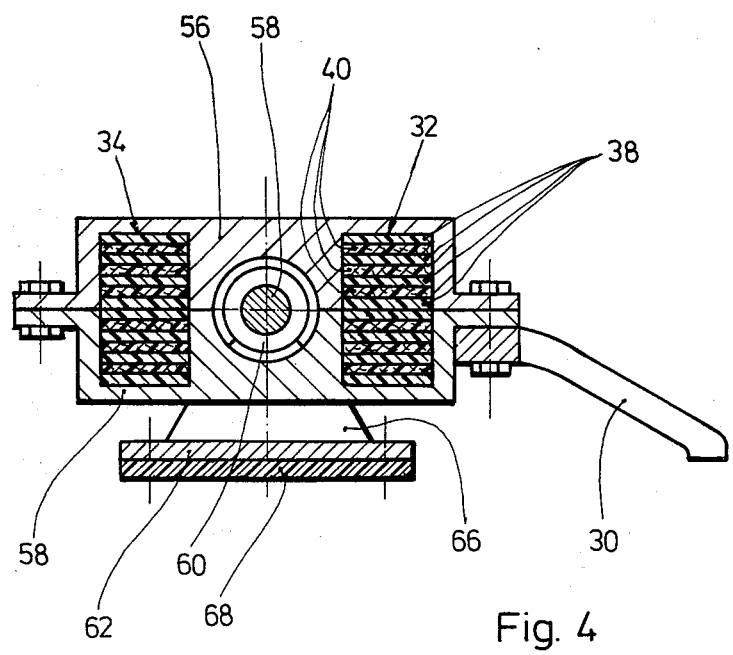
FIG. 4 is a sectional view along section line IV—IV in FIG. 3, with a modified construction of the sectional area of the carrier beam or tension bar as compared to FIG. 2.

The outer ends of the steering horns 30 which are pivoted to the steering or control rods 28, are displaced in the longitudinal direction of the respective bars 6, 8 and/or laterally relative to the opposite end or point of connection of the respective horn 30 to its bar 6, 8 so that a blade angle reduction is accomplished in response to an excursion of the rotor blades and in response to a bending of the respective bar 6 or 8 in the flapping direction. Stated differently, the arrangement of the steering horns 30 and the control rods 28 is such that they will counter act, for example the flapping motion. As illustrated in the figures, especially FIGS. 1 and 2, the inner ends 30 of the steering horns are secured to the bars 6, 8 in the area of the blade angle bearings 10, 12, 14, and 16. However, the connecting points between the bars 6, 8 and the horns 30 may be located radially inwardly along the respective bar relative to the blade angle bearings. The selection of the position of the connecting points between the horns 30 and the bars 6, 8 and the selection of the spacing of the pivot points 28' from said connecting points in the longitudinal direction of the bars 6 or 8 and perpendicularly thereto permits a varying of the extent of the blade angle reduction and to thus, for example, control the blade flapping. With regard to a certain type of bending resulting from the blade flapping it even is possible to amplify the blade angle reduction effect, for example, at the symmetric bending resulting from the wing flapping wherein both blades of a pair flap simultaneously in the same direction and whereby the respective beam 6 or 8 is bent substantially in the area of the rotational axis, in the flapping direction. As mentioned, the bars 6, 8 are elastic relative to torsion loads between the connecting points of the steering horns 30. As illustrated, these connecting points are located at the respective blade angle bearing. However, these connecting points may also be located anywhere along the respective bars 6, 8. The torsion elasticity of the bars 6, 8 should be as large as possible within the collective adjustment motion of the pitch angle of the blades, in order to keep the forces necessary for adjusting the pitch angle of the blades as small as possible. Further, the bars 6 and 8 must be constructed to have the necessary strength against tension loads and they must have the necessary stiffness or rigidity in the flapping direction as well as in the blade lead-lag or drag direction in order to transmit the centrifugal forces as well as the bending moments between the blade roots of the blades or wings forming a pair and arranged diametrically opposite each other. The bending strength of the bars 6, 8 in the flapping direction is selected so that the flapping resonance frequency of the unit comprising a blade pair and the respective bar is above the rotor rotation frequency and taking into account the blade stiffness. The bars 6, 8 are made stiff or rigid against bending in the tilting direction in such a manner that the ratio of the tilting resonance frequency to the rotor rotation frequency is smaller than 0.9. All blade angle bearings 10, 12, 14, and 16 are angularly movable in the flapping direction as well as in the tilting direction. At least one of the two bearings of a bar 6 or 8 is constructed to provide for an axial displacement or shifting of the respective bar 6 or 8 so that the respective bars may freely bend in the flapping and tilting direction without any restraint at the bearings. The construction of the blade angle bearings 10, 12, 14, and 16 for the bars 6 and 8 will now be described in detail with reference to FIGS. 2-4 having regard to the blade angle bearing 10 and its adjacent end section of the bar 6. The other bearings and end sections are constructed in the same manner. The bar 6, as shown in FIGS. 2-4 is constructed in the manner of a beam or girder subject to bending loads having reinforced boom sections 32 and 34. These boom sections have a large areal moment of inertia in the axial direction in order to achieve a large strength against bending in the flapping direction and in the tilting direction. The booms are spaced by means of web sections 36 which may extend the entire length of their respective booms to end immediately adjacent to the blade angle bearing 10. The web section 36 is preferably made of composite fiber material wherein the fibers cross each other and extend at an angle of about ±45° relative to the longitudinal direction of the boom sections 32, 34. These boom sections 32, 34 are made of several composite fiber material belts 38, the fibers of which all extend in the same direction and substantially in parallel to the longitudinal axis of the boom. The belts 38 are spaced from each other by intermediate plies 40 of elastomeric material. By combining several belts 38 made of composite fiber material with intermediate plies 40 of elastomeric material, a high bending strength in the flapping and in the tilting direction has been achieved while simultaneously assuring a good torsion elasticity of the bars 6 and 8. Another advantage of this structure according to the invention is seen in that due to the inner friction of the elastomeric material a damping effect is achieved which is especially useful with regard to damping the tilting vibrations causing a respective bending. The belts 38 form loops around the blade connecting sleeve 42 in the area of the bar ends. Fill-up pieces 44, 46 are inserted between the loops and the intermediate spaces between the boom sections 32 and 34. The fill-up pieces 44, 46 are made of composite fiber material and contribute to the shape formation as well as to the force transmission. In addition, both booms 32, 34 are held together by a layer 48 of composite fiber material, wherein the fibers extend in a crossover fashion. The elastomeric intermediate layers 40 are replaced radially outwardly of the blade angle bearing 10 by intermediate plies 50 of composite fiber material, the fibers of which are also extending in a crossover fashion, said intermediate plies 40 extending in the direction of the span length of the wings or blades. Due to the fill-up pieces 44, 46 and due to the composite fiber plies 50 which replace the elastomeric intermediate layers 40 between the belts 38 and which are bonded to the layers 38, the torsion elasticity of the bars 6 and 8 is limited to the area between the connection points of the steering horns 30. In the shown example said connection points are at the respective blade angle bearings. The sections of the bars 6, 8 in the area radially outwardly of said connection points of the steering horns 30, that is in the direction of the span length of the wings, have the torsion rigidity which is necessary for transmitting the control motions to the blade connection point.

According to a preferred embodiment, the blade angle bearing 10 forms an inner bearing which fits in an opening between the web section 36 and the fill-up pieces 44, 46. The inner bearing comprises a housing 52 rigidly connected to the bar 6 and surrounding the boom sections 32 and 34. The housing 52 comprises further a lower housing section 54 to which the control horn 30 is secured as well as an upper housing section 56 connected to the lower housing section 54, for example, by means of screws or the like. The housing sections 54, 56 carry a journal pin 58 which defines the bearing axis of the angle bearing. The journal pin 58 is supported at both ends by journals 60 in a bearing block 62 fitted into a recess of the bar 6. The bearing block 62 is rigidly secured to the rotor head.

The blade angle bearing 10 is constructed for safety purposes to constitute an emergency support bearing when an overload should occur or when the journal pin 58 should break. For this purpose the journals 60 are provided with a circular cross section which is concentric relative to the journal or bearing pin 58, in addition, the journals 60 are fitted into an also circular dead-end hole 64 of the bearing housing 52, said dead-end hole 64 also extending concentrically relative to the axis of the journal pin 58. As a result of this structure, the bar 6 is secured to the ring 4 of the rotor head by means of the bore 64 and the journals 60 in the bearing block 62 when the journal pin 58 should break or when it is exposed to an excessive load, whereby the bar 6 is rotatable about the angle bearing axis even under these operating conditions.

An axial play is provided between the journals 60 and the ends of the dead-end bore 64, as well as between the bearing housing 52 and the arms 66 of the bearing block 62 in order to permit an axial displacement or excursion of the bar 6 relative to the blade angle bearing 10. Furthermore, the blade angle bearings are angularly movable in the flapping direction as well as in the tilting direction of the wings in the manner of a so-called self-aligning or pivot bearing. This facility is provided by the intermediate layer or plie 68 which permits a tilting motion of the bearing block 62 relative to the rotor head. Instead of the illustrated slide bearings it is possible to use for the blade angle bearings anti-friction bearings or elastomeric bearings.

The unit comprising a bar 6 or 8 and a pair of rotor blades or wings 22A, 22B or 22C, 22D must be centered relative to the rotor head specifically relative to the rotor ring 4. This purpose may be accomplished in different ways. For example, according to one embodiment, one blade angle bearing of the pair of blade angle bearings of a bar 6 or 8 is constructed to permit an axial movement of the respective bar 6 or 8, while the other bearing is constructed as a bearing not permitting any axial movements. Another possibility to provide for said centering is to secure the bars 6 and 8 in the area of the rotational axis of the rotor by means of a centering device fixing the position in the axial direction. Such a centering device permits the bending of the bars 6 and 8 independently of each other and in both instances in the flapping direction as well as in the tilting direction.

Since the rotor blades are also made of a composite fiber material, it is possible to make the bars 6 and 8 together with the respective blade pair 22A, 22B or 22C, 22D as an integral structural unit, whereby the need for the fittings 24 and the connecting bolt 26 is obviated. In such a structure, it is possible that the belts 38 having a unitary directional extension of the fiber material in the longitudinal direction of the bars, 6, 8, extend further into the bendable neck section 20 of the respective rotor blades. Further, if desired, the bars 6, 8 may be provided in two parts, whereby the subdivision would extend in the area of the rotational axis of the rotor structure.

Incidentally, a composite fiber material would comprises the following components which are all well known in the art such as epoxy resin and carbon fibers.

Although the invention has been described with reference to specific example embodiments, it will be appreciated, that it is intended to cover all modifications and equivalents within the scope of the appended claims.

What is claimed is:

1. A rotor structure for a rotating wing aircraft having substantially rigid rotor head means and rotor blades or wing means arranged in at least one pair, comprising blade angle bearing means (10, 12, 14, 16) for each rotor blade means, tension bar means (6,8) operatively interconnecting the rotor blade means of a pair which blade means are arranged diametrically opposite each other, said tension bar means having a high bending resistance, whereby transmission of bending moments from the rotor blades to the rotor head means is substantially prevented, each of said blade angle bearing means comprising a structure angularly movable in the wing flap direction and in the wing lead-lag direction, at least one of said blade angle bearing means of a pair comprising means permitting an axial motion of the respective tension bar means supported in said blade angle bearing means, and wherein said blade angle bearing means (10, 12, 14, 16) operatively support said tension bar means (6, 8) on said rotor head means (4) for pitch angle rotation of said tension bar means relative to said rotor head means (4), said rotor structure further comprising means (24) securing said rotor blade means (18) to said tension bar means (6, 8) in a manner rigid against rotation of the blade means about the longitudinal blade axis whereby the securing means prevent flapping, drag and lagging movements of the tension bar means, said tension bar means being constructed as torsion bars which are elastic relative to torsion about said longitudinal blade axis.

2. The rotor structure of claim 1, wherein said tension bar means are made of a composite fiber material.

3. The rotor structure of claim 1, wherein said tension bar means comprise reinforced boom sections and web sections operatively interposed between said boom sections to space the boom sections from each other.

4. The rotor structure of claim 3, wherein said boom sections and said web sections of said tension bar means are made of composite fiber material having fibers extending substantially in the longitudinal direction of said boom sections, said fibers extending in crossing fashion in said web sections whereby the fibers in the web sections extend at an angle of about ±45° relative to the longitudinal direction of said boom section.

5. The rotor structure of claim 4, wherein said boom sections of said tension bar means comprise a plurality of composite fiber material belts extending in the longitudinal direction of said boom sections, and a plurality of elastomeric material intermediate layers operatively interposed between said belts.

6. The rotor structure of claim 5, further comprising recesses in said intermediate layers of elastomeric material, said recesses being located adjacent the ends of the respective tension bar means between adjacent belts, and plies of composite fiber material bonded into said recesses, said plies comprising fibers extending in crossover fashion in said plies.

7. The rotor structure of claim 1, wherein said tension bar means comprise openings, said blade angle bearing means being located in said openings thus forming inner bearing means.

8. The rotor structure of claim 1, wherein said blade angle bearing means comprise auxiliary bearing members constituting emergency support bearings.

9. The rotor structure of claim 1, further comprising a number of steering members and steering rod means, each steering member having a first end operatively connected to the respective tension bar means at respective connection points, and a second end operatively connected to the respective steering rod means, said first and second ends of said steering members being displaced relative to each other such that a blade angle reduction is accomplished in response to an excursion of the rotor blades and in response to any bending of the tension bar means in the flapping direction.

10. The rotor structure of claim 9, wherein said tension bar means are constructed to be elastic relative to torsion loads between said connection points of the steering members to the tension bar means, the remainder of said tension bar means being rigid relative to said torsion loads.

11. The rotor structure of claim 1, further comprising rotor head means including a ring bearing member for said rotor structure.

* * * * *